UNITED STATES PATENT OFFICE.

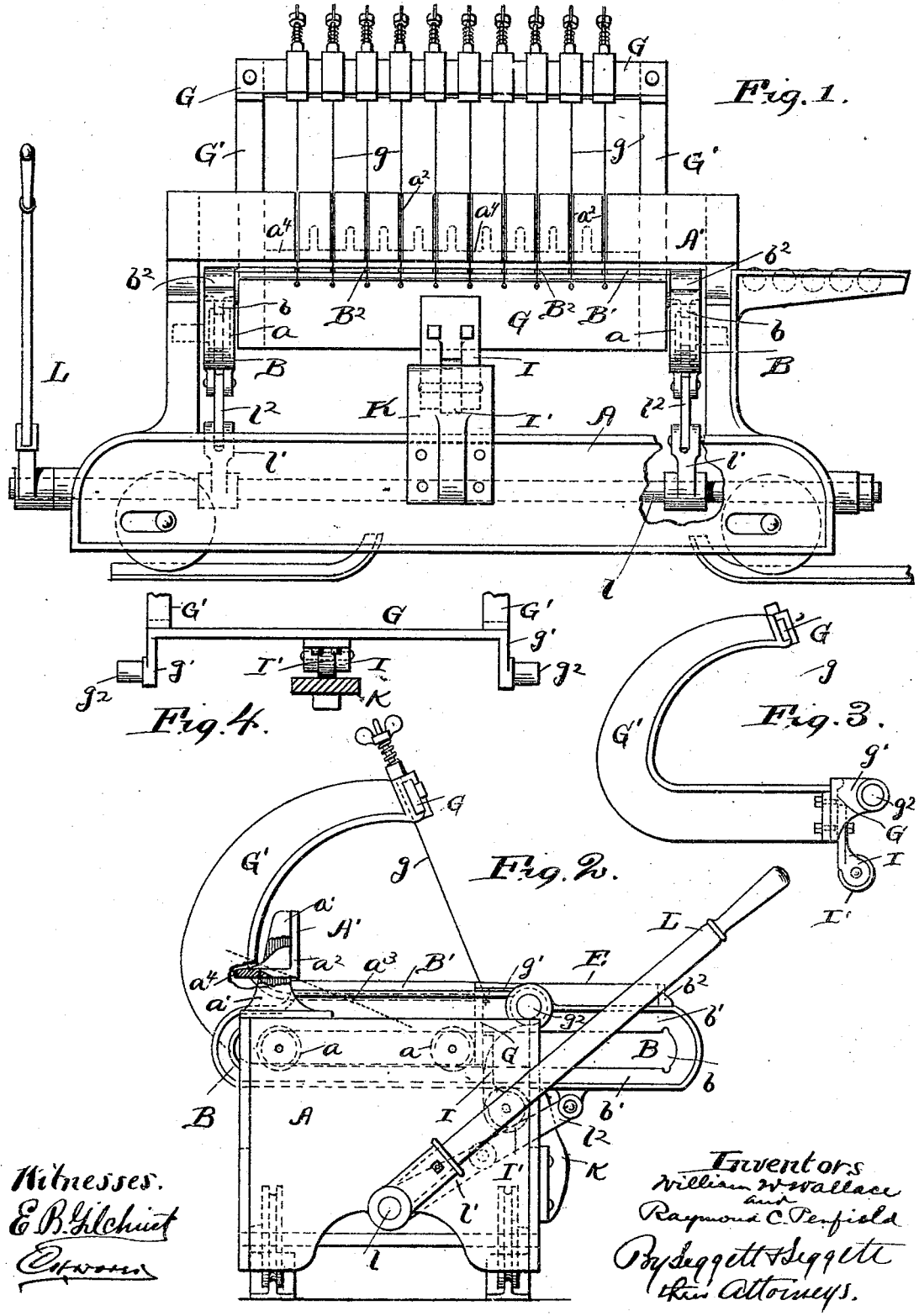

WILLIAM W. WALLACE AND RAYMOND C. PENFIELD, OF WILLOUGHBY, OHIO.

CUT-OFF TABLE FOR BRICK-MACHINES.

SPECIFICATION forming part of Letters Patent No. 515,383, dated February 27, 1894.

Application filed November 7, 1893. Serial No. 490,245. (No model.)

*To all whom it may concern:*

Be it known that we, WILLIAM W. WALLACE and RAYMOND C. PENFIELD, of Willoughby, in the county of Lake and State of Ohio, have invented certain new and useful Improvements in Cut-Off Tables for Brick-Machines; and we do hereby declare the following to be a full, clear, and exact description of the invention, such as will enable others skilled in the art to which it pertains to make and use the same.

Our invention relates to an improved cut-off table for brick machines, wherein is provided, a flat, smooth-faced horizontally-reciprocating frame bearing a table for receiving thereon the bar or column of clay, and, in cutting the bar of clay into bricks, said table is moved laterally or rearwardly from under the bar of clay and, by the same operation, an off-bearing board or pallet follows the table and takes its position under the bar of clay, so that, when the latter is severed into bricks, the bricks rest on the pallet, the face of the table meantime being exposed and in position for cleaning and lubricating the same. With the reverse movement of the parts, the pallet, laden with the bricks, retires to where it is out of the way of the next supply of clay to the table, and, during such next supply, the laden pallet is supposed to be removed from the machine and an empty pallet substituted therefor. The severing-wire-frame is carried forward and back by the reciprocating-frame and, hence, the severing-wires cut laterally through the bar of clay; but the severing-wires are mounted on a laterally-oscillating frame that is pivotally connected with the aforesaid reciprocating-frame, the oscillating-frame having preferably a roller that engages a stationary plate or surface by which engagement the wire-bearing-frame, as it is moved to bring the wires into engagement with the bar of clay, is, at the same time, tilted rearwardly and downwardly, such compound movement imparting to the wires more or less end movement, relative to the bar of clay, resulting in what is known as a "draw-cut," and, at the same time, the downward movement of the wires upon the bar of clay makes a clean smooth cut along the upper edges of the bricks.

In the accompanying drawings, Figure 1 is a front side elevation, and Fig. 2 is an end elevation of a cut-off table embodying our invention, portions being broken away and in section to more clearly show the construction. Fig. 3 is an elevation of the severing-wire-frame, and Fig. 4 is a top plan, partly in section, of a portion of the severing-wire frame detached.

A represents a suitable supporting-frame bearing grooved rollers, $a$, that are arranged in pairs, usually at or near the respective ends of the structure. Upon said rollers is suitably mounted the table-bearing-frame B, that, at each end, has a slotted bar or piece, $b$, the internal parallel edges, $b'$, whereof fit in the grooves of the aforesaid rollers. B' designates the table of frame B. The upper surface of the table is flat and smooth so as to receive, with as little friction as possible, the bar or column of clay. By the front side of table B' is placed a removable pallet E (shown only in Fig. 2) that is supported by members $b$ of the table-bearing-frame, and the latter has flanges, lugs or suitable projections or attachments, $b^2$, to hold the pallet snug against the table. The table and pallet are supposed to be flush with each other on top, or, if otherwise, the top surface of the pallet should be somewhat lower than the top surface of the table.

The severing-wire-frame consists of two longitudinal bars or members G located a suitable interval apart at the forward side of the frame and connected with each other, at opposite ends, by yokes G'. The severing-wires $g$ are suitably stretched from one longitudinal member to the other and fastened to said members, any suitable well known device being employed for straining the wires. The upper longitudinal bar or member G of the severing-wire-frame is located somewhat rearwardly of the lower longitudinal bar or member G of said frame so that the severing-wires incline rearwardly toward their upper end. The severing-wires are arranged parallel with each other and separated the one wire from the next adjacent wires the necessary distance to sever the bar or column of clay into bricks of the desired size. The wire-bearing-frame, preferably a suitable distance forward of the attachment of the lower ends of the severing-wires, is pivotally connected with the horizontally-reciprocating table-bearing frame, B, the lower longitudinal bar G of the wire-bearing-frame being preferably provided, at each end, with a forwardly-projecting flange or arm $g'$. Members $g'$ at their outer side and forward extremity are provided, respectively, with a trunnion $g^2$ suitably journaled in the adjacent member $b$ of the horizontally-reciprocating frame B.

The lower longitudinal bar G of the wire-bearing-frame, preferably at its central portion, is provided with a roller-bearing-bracket, I, that depends a suitable distance below the bar and has its roller $I'$ engaging the back or inner side of a plate or member, K, rigid or integral with the supporting-frame.

By the construction thus far described, it will be observed that when the table-bearing-frame is reciprocated rearwardly to bring the off-bearing-board or pallet in under the bar of clay being operated upon, the oscillating wire-bearing-frame, being pivotally connected with the reciprocating table, will move rearwardly with the table-bearing-frame, and thereby move the aforesaid roller-bearing-bracket farther from the surface engaged by the roller of said bracket, resulting in the upward movement of said roller on the bearing-plate or surface, and thereby permitting the wire-bearing-frame to tilt or oscillate rearwardly and downwardly by gravity. Upon the forward reciprocation or return movement of the reciprocating table-bearing-frame, the roller-bearing bracket of the wire-bearing-frame will again approach the plate or surface upon which the roller of said bracket bears, resulting in the downward movement of the roller upon said plate or surface into its normal position.

The reciprocation of the table-bearing-frame is effected by means of a hand-lever L that is operatively connected with a shaft $l$ arranged lengthwise of and suitably supported by frame A. Shaft $l$, at or near each end of frame A, is provided with a rock-arm $l'$. Said rock-arms are set in line with each other and are operatively connected, by means of links $l^2$, with the adjacent member $b$ of the table-bearing-frame.

The supporting-frame, at the rear side, is provided with a vertical stationary back, $A'$, that is located in a plane just above the top surface of table $B'$ and is supported at opposite ends by brackets $a'$ rigid with the supporting-frame. The table, is, therefore, adapted to move in under back $A'$ during the rearward movement of the table-bearing-frame and said back, during such movement of the frame, is adapted to push the bricks of clay from the table on to the off-bearing board or pallet. With the return movement of the parts to the place of beginning the bricks are carried by the pallet forwardly out of the way, and the table is again brought into position for receiving another discharge from the brick-machine.

By the construction hereinbefore described, it will be observed that a compound movement is given to the wire-bearing-frame, the latter not only cutting the clay laterally but at the same time cutting it downwardly, thereby effecting a clean cut along the upper surface of the clay.

Back $A'$ of the supporting-frame has narrow slots $a^2$ to receive the severing-wires as the latter approach the end of the cut, and table $B'$ is also slotted, as at $B^2$, to accommodate the location and operation of the severing-wires.

The position of the wires at the end of the cut are approximately indicated by dotted line $a^3$ in Fig. 2. Back $A'$ has a longitudinal reinforcing rib $a^4$, whereby said back, notwithstanding slots $a^2$, has sufficient strength for the purpose for which it is intended.

What we claim is—

1. In a cut-off table for brick-machines, in combination, a supporting-frame, a horizontally-reciprocating-frame suitably mounted upon the supporting-frame, said horizontally-moving frame having a table for receiving the bar or column of clay to be severed into pieces and being adapted to receive an off-bearing-board or pallet forward of said table, the supporting-frame being provided with a stationary back arranged in a plane above and lengthwise of the table and adapted to engage the severed pieces of clay and force the same from the table onto the off-bearing board or pallet during the rearward movement of the table-bearing-frame, and a severing-wire-frame pivotally connected with the table-bearing-frame and adapted to tilt rearwardly and downwardly, substantially as and for the purpose set forth.

2. In a cut-off table for brick machines, the combination with the supporting-frame, a horizontally-reciprocating-frame suitably mounted upon the supporting-frame and bearing a table for receiving the bar or column of clay to be severed into pieces, and suitable means for actuating the reciprocating-frame, of a laterally tilting or oscillating severing-wire frame pivotally connected with the aforesaid reciprocating-frame and adapted to automatically oscillate to perform its function, substantially as set forth.

3. In a cut-off table for brick-machines, the combination with the supporting-frame, a horizontally-reciprocating-frame suitably mounted upon the supporting-frame and having a table for receiving the bar or column of clay to be severed into pieces, and suitable means for actuating the reciprocating-frame, of a laterally-tilting or oscillating severing-wire-frame pivotally connected with the aforesaid reciprocating-frame, a roller supported from the forward side of the severing-wire-frame and a stationary plate engaging the forward side of said roller, substantially as and for the purpose set forth.

4. In a cut-off table for brick-machines, the combination with the supporting-frame, a horizontally-reciprocating-frame suitably mounted upon the supporting-frame, said reciprocating-frame having a table B' slotted, as at B², and being adapted to receive an off-bearing board or pallet forward of said table, the supporting-frame having a stationary-back A' slotted as at A², all arranged and operating substantially as indicated, of a laterally-tilting or oscillating-frame bearing the severing-wires and pivotally connected with the reciprocating-frame, a roller-bearing bracket rigid with and located at the forward side of the wire-bearing-frame, and a stationary plate engaging the forward side of the roller of the aforesaid roller-bearing-bracket, substantially as and for the purpose set forth.

In testimony whereof we sign this specification, in the presence of two witnesses, this 15th day of September, 1893.

WILLIAM W. WALLACE.
RAYMOND C. PENFIELD.

Witnesses:
C. H. DORER,
L. W. PENFIELD.